United States Patent [19]
Jäger

[11] Patent Number: 5,015,219
[45] Date of Patent: May 14, 1991

[54] ROLLER BELT ARRANGEMENT FOR CATERPILLAR TRACK-TYPE VEHICLES

[76] Inventor: Arnold Jäger, Gehrbergsweg 6A, D-3167 Burgdorf, Fed. Rep. of Germany

[21] Appl. No.: 466,044

[22] Filed: Jan. 17, 1990

[30] Foreign Application Priority Data

Jan. 21, 1989 [DE] Fed. Rep. of Germany ....... 3901798

[51] Int. Cl.⁵ .................................................. F16G 1/00
[52] U.S. Cl. ....................................... 474/204; 474/901
[58] Field of Search .................... 474/204, 238, 901; 198/803.8, 835

[56] References Cited

U.S. PATENT DOCUMENTS 3,007,745 11/1961 Even ..................................... 474/901
3,120,409 2/1964 Beall ................................. 474/204 X
3,436,128 4/1969 Boulanger ........................ 474/204 X Primary Examiner—Thuy M. Bui
Attorney, Agent, or Firm—Robert W. Becker & Associates

[57] ABSTRACT

A roller belt arrangement for caterpillar track-type vehicles and having several rotating belts that are connected via grippers that guarantee a positive drive and are secured to the belts via screw bolts. To prevent lateral bulging of the belt from occurring during securement of the grippers, which bulges lead to undesired shearing stresses in the belt body, in the vicinity of lateral edges of the gripper and/or their securement elements, the rubber cover layers are provided with notches that extend along the edges and prevent or reduce the stresses in the belt body caused by the bulging.

10 Claims, 1 Drawing Sheet

ROLLER BELT ARRANGEMENT FOR CATERPILLAR TRACK-TYPE VEHICLES

BACKGROUND OF THE INVENTION

The present invention relates to a roller belt arrangement for a caterpillar track-type vehicle, especially a snowmobile, having one or more inextensible, rotating belts that extend parallel to one another and to which transversely extending driver or gripper means are secured via bolts, rivets, or the like that pass through the belts, whereby on that side of the belts remote from the gripper means the bolts, rivets, etc. act upon this inner side of the belts via contact elements, with the belts each comprising an inextensible core that is disposed between two protective cover layers that are made of rubber or the like and are secured thereto.

Such protective cover layers have the advantage that the gripper means and/or the contact elements do not act directly upon the core, which is comprised, for example, of woven material, but rather these parts rest upon the resiliently deformable cover layers, which thus serve as protection and at the same time also provide for a certain amount of resilience in the mounting of the gripper means. It is to be understood that upon securement of the gripper means, a deformation that conforms to the securing pressure must enter the cover layers. In so doing, parts of the layers that are subjected to pressure are displaced toward the side. However, a displacement also occurs for those portions of the core that are subjected to the pressure. Consequently, the body of the belt in the vicinity of the gripper means undergoes a bulging that can lead to shearing stresses within the belt body and can result in loosening and separation of the belt body.

It is therefore an object of the present invention to embody roller belt arrangements of the aforementioned general type in such a way that the unavoidable deformations of the belt body in the region of the gripper means cannot lead to disadvantageous effects, especially separations of the belt body.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
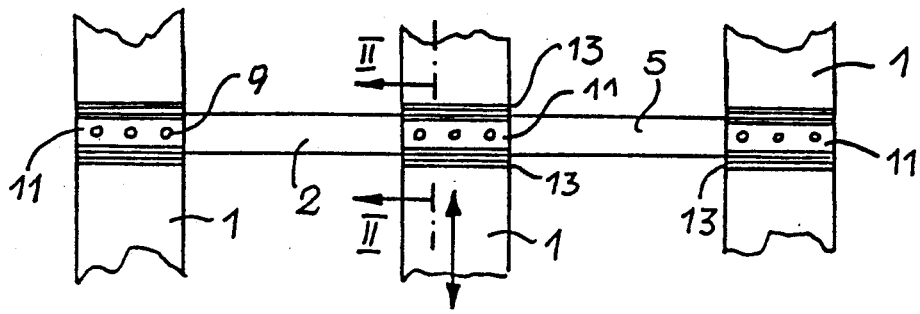
FIG. 1 shows a longitudinal portion of the inner side of one exemplary embodiment of the inventive roller belt arrangement for a caterpillar track-type vehicle for use in snow.
Figure 2:
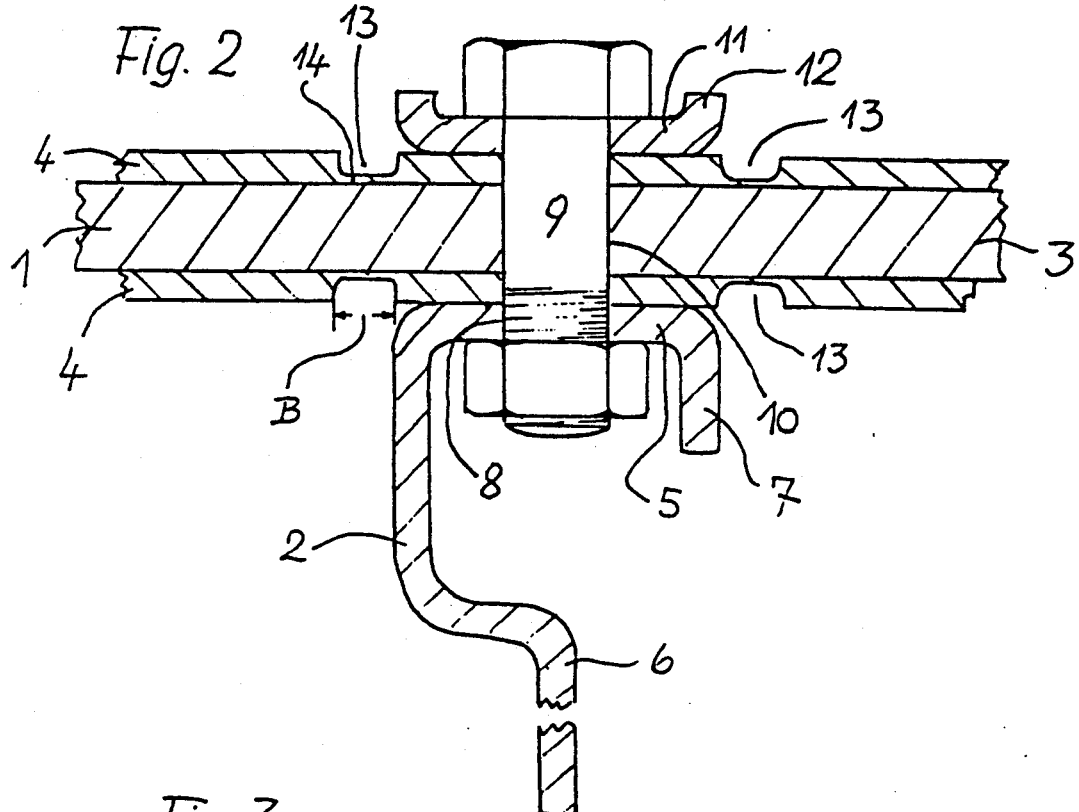
FIG. 2 is a cross-sectional view taken along the line II-II in FIG. 1.

The roller belt arrangement of the present invention is characterized primarily in that in the vicinity of the edges of the gripper means and/or the contact elements, the cover layers are provided with notches that extend along these edges. These notches serve to relieve the cover layers; the notches receive the deformed portions of the rubber, and possibly also of the belt core, and prevent those portions of the cover layers that are disposed at a distance from the gripper means and the contact elements from being adversely affected. For this reason, the notches act as displacement spaces and prevent undesired stresses from being transmitted to the remaining portions of the cover layers. The depth of these notches is expediently only such that they do not extend entirely through the cover layers. Rather, the notches should still have a base that is made out of rubber or the like and that is in a position to protect the most sensitive belt core.

Further specific features of the present invention will be described in detail subsequently.

DESCRIPTION OF PREFERRED EMBODIMENTS

Referring now to the drawing in detail, the roller belt arrangement is essentially formed from three inextensible, flexible belts 1 that extend parallel to one another. The belts 1 are guided on the vehicle via wheels, and serve for the securement of transversely disposed driver or gripper means 2 that are intended for guaranteeing positive drive of the vehicle in snow. These gripper means 2 extend over the entire width of the roller belt arrangement and span the space between the belts 1.

The belts 1 have an inextensible core 3 in the form of a rubberized square-woven fabric that thus comprises woof and warp threads. The top and bottom of this flexible core 3 is covered by a protective cover layer 4 of rubber that is secured thereto.

It is to be understood that all of the parts of the belt 1 are held securely together or are interconnected by vulcanization or the like.

In order to be able to reliably secure the gripper means 2, the base 5 of the gripper means, along with the actual, transversely projecting driver or gripper portion 6 and the flange 7 that is disposed on the other side of the base 5 and is angled off downwardly, are disposed on the outer side of the cover layer 4. The base 5 is provided with spaced-apart holes 8 for receiving screw bolts 9 that extend through a hole 10 in the belt 1 and on the inner side of the belts, pass through a metal strip 11 having angled-off edges 12.

The gripper means 2 are thus securely anchored on the belts 1. Since the base 5 and the metal strip 11 rest upon the cover layers 4, a resilient rather than rigid mounting is provided.

However, a further prerequisite for a good securement is that the screw bolts 9 be securely tightened, an inherent result of which is that the belts 1 are elastically deformed in the clamping region. A result of this deformation is that not only the core 3 but also the cover layers 4 are displaced toward the side. In order to prevent this displacement, and the thickening (bead formation) that is associated therewith next to the rigid parts 5 and 11, from damaging the body of the belt, for example due to excessive tangential or shearing stresses, notches 13 are provided in the cover layers 4 on both sides of the rigid clamping parts 5 and 11, with these notches 13 extending parallel to the edges of these rigid parts. However, the notches 13 do not extend all the way through the cover layers 4; rather, a thin layer 14 remains at the base of each notch 13 so as not to expose the core 3. Where the cover layer 4 has a thickness of approximately 3 to 4 mm, the thin layer 14 should still have a thickness of approximately 0.5 mm (the thickness of the layer 14 is approximately 1/6 to ¼ the thickness of the cover layer 4). The width B of the notches 13 should be about 4–12 mm, although the following should be taken into consideration when determining the dimensions of the notches 13.

Figure 3:
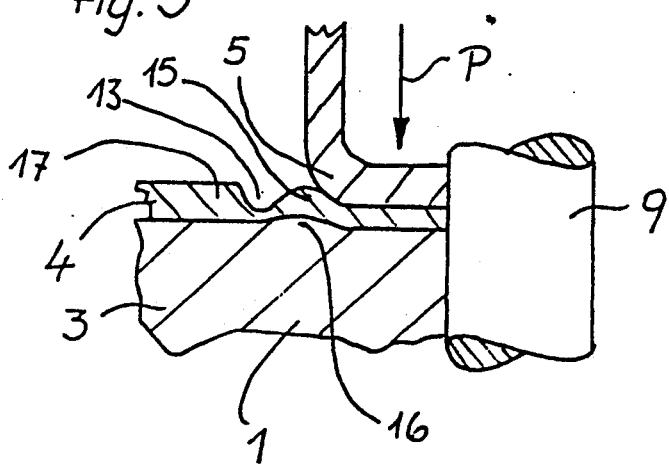
FIG. 3 shows a portion of a securement location of a gripper means, and in particular in a view similar to that of FIG. 2 emphasizing the deformation of a belt of the roller belt arrangement.

As can be seen from FIG. 3, the core 3 and the cover layer 4, as a result of the pressure P on the base 5, undergo a reduction in thickness, because the cover layer 4 (as indicated by the reference numeral 15) and the core 3 (as indicated by the reference numeral 16) are displaced to the side, accompanied by the formation of a bead or bulge. Thus, the width of the notches 13 must be such that these bulges cannot, or practically cannot, reach that portion 17 of the belt 1 that is disposed laterally outwardly of the notch 13. Thus, the regions 17 of the belt are not subjected to the stresses caused by the formation of the bulges. This results in an increased service life of the belts 1, which can furthermore be stressed to a greater extent.

It should be noted that the notches 13 could also be disposed in such a way that they are actually disposed partially beneath the rigid parts 5 and 11, although the embodiment illustrated in the drawing appears to be more effective.

It is to be understood that the notches 13 are provided both on the inside and the outside of the belt 1. However, the notches 13 on the outside of the belt 1 (in the region of the gripper means 2) are particularly effective, because the greatest stresses within the belts 1 occur at that location.

The present invention is, of course, in no way restricted to the specific disclosure of the specification and drawing, but also encompasses any modifications within the scope of the appended claims.

WHAT I CLAIM IS:

1. In a roller belt arrangement, for a caterpillar track-type vehicle, having two or more inextensible, rotating belts that extend parallel to one another and to which transversely extending gripper means are secured via securing means that pass through said belts, whereby on an inner side of said belts remote from said gripper means said securing means act upon said inner side of said belts via contact elements, with said belts each comprising an inextensible core that is disposed between two protective cover layers that are secured thereto, the improvement wherein: in the vicinity of lateral edges of at least one of said gripper means and said contact elements, said cover layers are provided with notches that extend along said lateral edges.

2. A roller belt arrangement according to claim 1, in which said notches extend only partially through said cover layers so as to provide at a base of each notch a layer having a thickness that is considerably less than the depth of said notch.

3. A roller belt arrangement according to claim 2, in which the thickness of said layer at said base of said notch is approximately 1/6 to ¼ of the thickness of said cover layer.

4. A roller belt arrangement according to claim 1, in which said notches have a width that corresponds at least approximately to a lateral spreading of bulges of said belt core and/or cover layers that result next to said gripper means and/or contact elements during securement thereof via said securing means.

5. A roller belt arrangement according to claim 1, in which said notches have a width of approximately 4–12 mm.

6. A roller belt arrangement according to claim 1, in which said notches are disposed directly adjacent said gripper means and/or contact elements.

7. A roller belt arrangement according to claim 1, in which said notches extend over the entire length of those portions of said gripper means and/or contact elements that are in contact with said belts.

8. A roller belt arrangement according to claim 1, in which said notches have a U-shaped cross-sectional configuration, with the sides thereof meeting the base thereof via rounded-off portions.

9. A roller belt arrangement according to claim 1, in which said lateral edges of said gripper means and contact elements are greatly rounded-off where they face said cover layers.

10. A roller belt arrangement according to claim 1, in which each of said belts is provided with notches on both sides of said belt and on both sides of both said gripper means and said contact element.

* * * * *